US005221405A

United States Patent [19]

Trouteaud

[11] Patent Number: 5,221,405

[45] Date of Patent: Jun. 22, 1993

[54] LABEL APPLYING SYSTEM

[75] Inventor: Lee E. Trouteaud, Tipp City, Ohio

[73] Assignee: Premark FEG Corporation, Wilmington, Del.

[21] Appl. No.: 920,970

[22] Filed: Jul. 28, 1992

[51] Int. Cl.[5] ..... B32B 31/00

[52] U.S. Cl. ..... 156/364; 156/571; 156/572; 271/95; 271/107

[58] Field of Search ..... 156/364, 571, 572; 271/95, 107

[56] References Cited

U.S. PATENT DOCUMENTS

| | | | |
|---|---|---|---|
| 3,428,509 | 2/1969 | Messmer | 156/361 |
| 4,124,436 | 11/1978 | Pettis, Jr. et al. | 156/542 |
| 4,390,390 | 6/1983 | Margraf et al. | 156/566 |
| 4,787,953 | 11/1988 | Troutead et al. | 156/387 |
| 4,895,614 | 1/1990 | Troutead et al. | 156/542 |

*Primary Examiner*—David A. Simmons
*Assistant Examiner*—William J. Matney, Jr.
*Attorney, Agent, or Firm*—Russell L. McIlwain; William Weigl

[57] ABSTRACT

Label applier of an automatically operated label applying system is selectively controlled by a machine operator to rotate self-adhesive labels to any of a variety of different angular orientations in response to interception of a driving bevel gear at a predetermined position. A driven pinion gear which carries a vacuum wand with a vacuum gripper on an end thereof rotates the wand and label to any one of 90, 180 or 270 degrees, depending on which of three intercepting pins is activated under selective control of an operator. In the event no intercepting pin is activated, the drive gear rotates through the same angle as its supporting shaft and effectively avoids rotation of the driven gear and turning of the label. The label applier is remotely controlled by automatic means, thereby avoiding the necessity to make manual changes to the applier each time a new angular orientation becomes necessary.

17 Claims, 3 Drawing Sheets

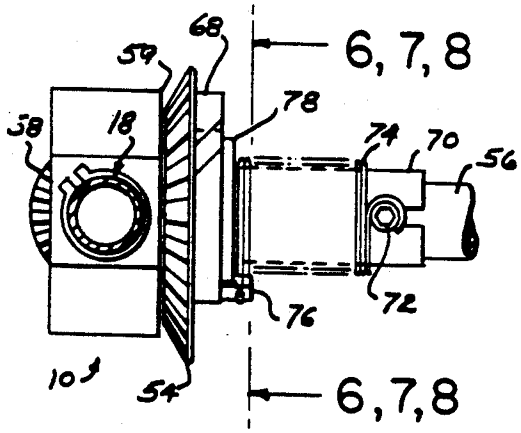
FIG. 5
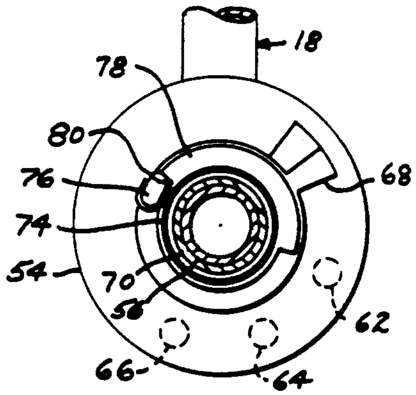
FIG. 6
FIG. 7
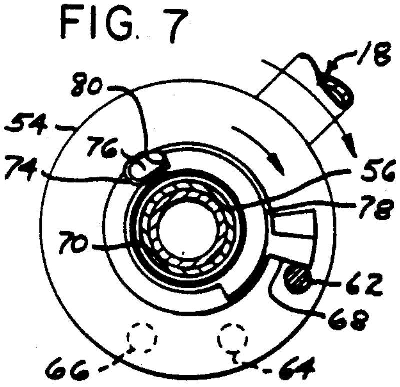
FIG. 8
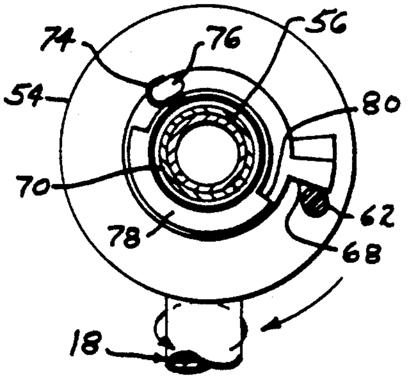
FIG. 10
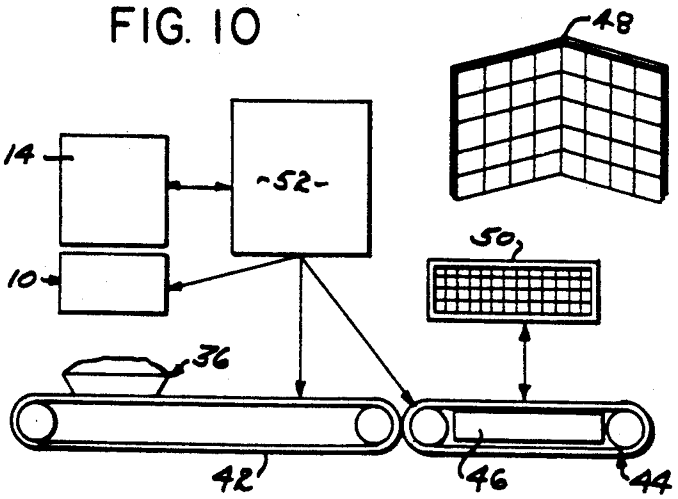
FIG. 9
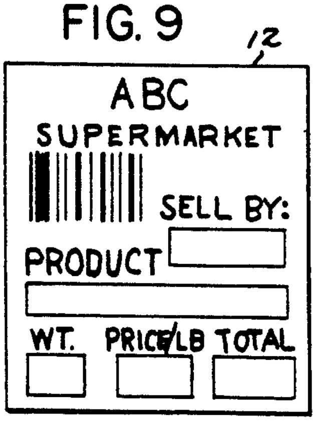

LABEL APPLYING SYSTEM

This invention relates to a system for automatically applying labels to packages or articles in any one of a variety of different angular orientations in response to remote control of a label applier by an operator, and to a novel label applier responsive to such control.

BACKGROUND OF THE INVENTION

Angular orientation of labels by a label applier is well known. Typically, the machine operator must physically reset the mechanism by hand for each change in label orientation. While that is satisfactory for long package runs where labels are identically positioned on numerous packages, this presents a productivity problem in instances where two, three or a half-dozen packages of one product are run successively at high speed, followed by a similar amount of packages of another product which need a different label orientation.

In the supermarket industry, for example, automatic film wrapping machines handle successive packages of meat or produce in different size packages and of different product. Present day machines of this type are capable of wrapping at fairly high speed, on the order of 32 packages per minute. Obviously, if an automatic weighing and labeling operation is connected to the wrapping machine at its exit end, and if the labels must be changed in their physical orientation relative to the package because of the way the packages are to be displayed in a meat case, for example, any requirement to make manual changes to reset the label applier would nullify the advantage of using a high speed wrapping machine.

An example of a label applier which requires manual changes to effect label reorientation is shown in U.S. Pat. Nos. 4,787,953 and 4,895,614 issued to myself and Treiber. When used in conjunction with equipment where productivity and speed are either not essential or are of only nominal importance, the label applier of those patents is quite acceptable. It is also quite suitable when used with high speed equipment where the frequency of change of orientation is occasional, rather than regularly occurring. However, it would be clearly unacceptable and would defeat the very purpose of a high speed stretch wrapping machine if a label applier was the last unit in a complete system and the need to change label orientation was frequent.

One solution to this problem is to reorient the printing itself, (as distinguished from physically turning the label), as is disclosed in U.S. Pat. No. 4,857,121 issued to Markley et al. While the system of Markley is quite acceptable for changing product names on merchandising labels, its suitability for use with pricing labels is questionable. A merchandising label needs only the product name itself, and thus, the memory required is for the given limited number of meat products run in a particular store, multiplied by the possible number of different angular orientations for each product. In contrast, a pricing label typically requires not only the product name, but also an indication of the weight, the price per pound, the total value of the package, and in modern supermarkets, a bar code for use in product identification at the check-out counter and a "sell by" date. Even if it were possible to utilize the Markley concept for pricing labels, it would likely find nominal use in supermarkets. Many stores use preprinted labels with their store name and category information located in predetermined positions on the labels. Were the print orientation of Markley used with such preprinted pricing labels, three of the four possible angular label positions would have the store name and category information readable from a different angle than the weight, price and total information. In one instance, the store name and category information would be upside down from the data printed for that particular package, and in the other two, it would be at right angles to the product data. Depending on the locations where the data was to have been placed if upright in relation to the preprinted information, the data might be printed directly over the store name if the label were inverted 180 degrees. It is believed unlikely that a store would be willing to accept the "Markley" print orientation for pricing labels, because of the incompatibility of the preprinted label information with the printed data except for one particular label angle.

SUMMARY OF THE INVENTION

A label applier capable of applying labels in a variety of different angular orientations is selectively controlled by a machine operator from a keyboard. The label applier is at the exit end, in its preferred application, of a total system including a combined package wrapping machine, weighing scale and labeler. As trays of meat are hand fed into the wrapping machine, the operator inputs information regarding the product name, where the label should be applied to the package and what angular orientation the label should receive. Each product already has its price per pound and normal label position stored in memory for each product. As the operator shifts from feeding one product to another, he can also change the label angle, depending on how that particular package is intended to be displayed in a meat case. This can be done by overriding the stored label angle information from a remote console.

The label applier comprises a vacuum tube or wand which pivots from a label pick-up station to a delivery station. As shown, the label is inverted at the pick-up station and must be reinverted for application to the package. In the disclosed form of my invention, the label is stripped from the wand at the delivery station and slapped onto the package.

The novel applier mechanism includes a pivotal shaft supporting the wand, a drive bevel gear freely mounted on the shaft and spring-biased toward the delivery station and a driven bevel gear mounted coaxially with the wand and in mesh with the drive gear. A plurality of intercepting pins are angularly positioned adjacent the back face of the drive gear to selectively engage an abutment on the gear back face and prevent the drive gear from traveling for the full stroke of the shaft toward the delivery station when called upon to do so. The pin selected determines the extent of the angle through which the wand will turn. As the drive gear is arrested, the driven gear rotates and commences to rotate the wand on its axis, turning the label angularly en route to the delivery station. The labels are held by vacuum until ready to be stripped from the wand at the delivery station. When so stripped, the label will be applied to the package at the angle previously assigned by the operator at the keyboard.

BRIEF DESCRIPTION OF THE DRAWINGS

FIG. 5 is a fragmentary view of the drive mechanism for the label applier, looking essentially from above when the applier is in position to receive a label at the pick-up station.

FIGS. 6, 7 and 8 are three consecutive positions of the elements of FIG. 5 as seen essentially along the line indicated by arrows 6, 7, 8. FIG. 6 shows the elements at the pick-up station as they have just received a label. FIG. 7 shows those elements as an intercepting pin arrests the drive gear when the system has been instructed to rotate the label 270 degrees, and FIG. 8 shows the relationship of the parts after the label wand arrives at the delivery station.

FIG. 9 is a representative label commonly used in the supermarket industry on meat packages, with a preprinted store logo and category information.

FIG. 10 is a schematic block diagram illustrating the path along which a package moves and the controls operated by the machine operator to enable remote control and automatic functioning of the label applier.

DESCRIPTION OF THE PREFERRED EMBODIMENT

Figures 1, 2:
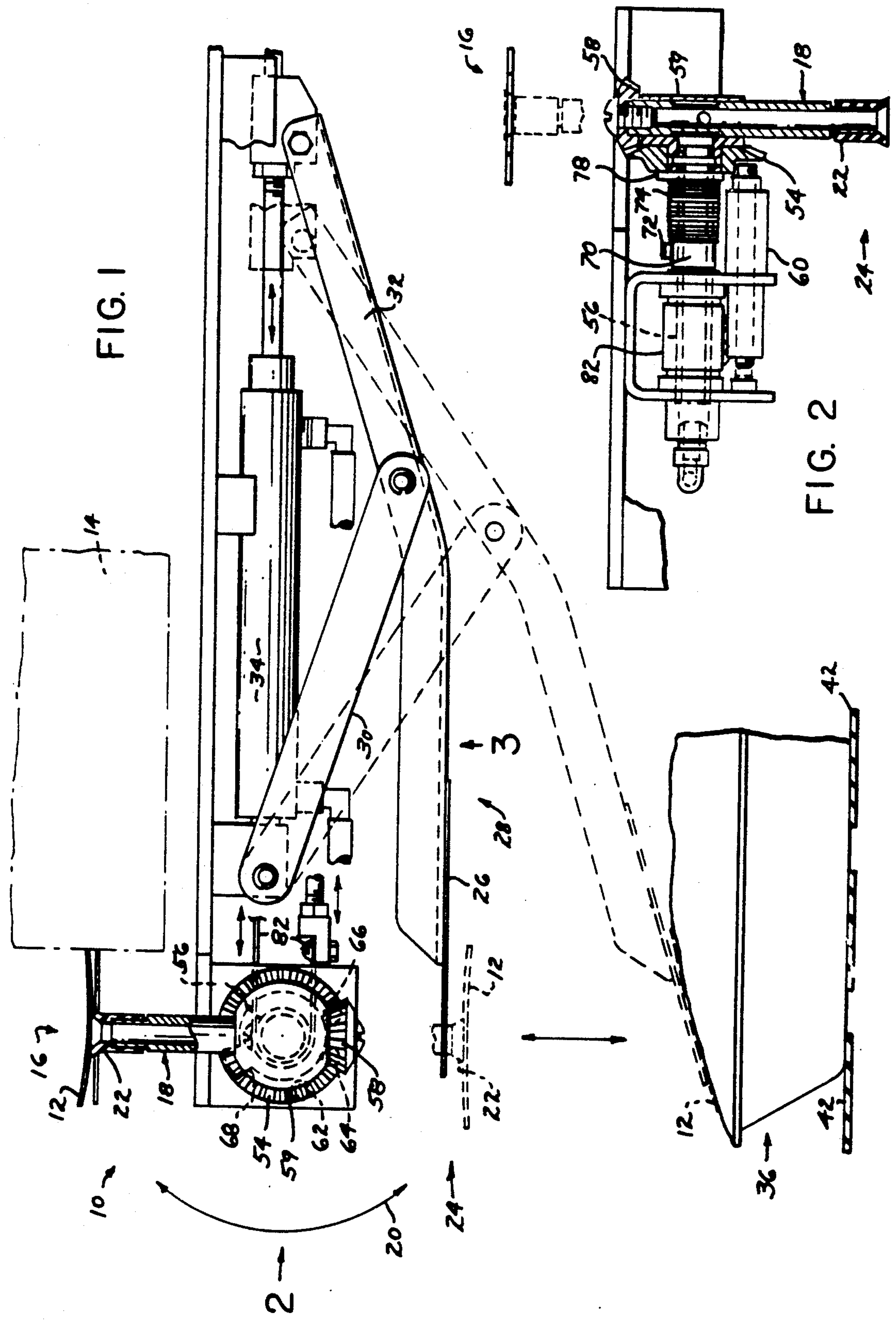
FIG. 1 is a fragmentary side elevational view of the label applier and label stripper showing the parts in their full line positions at the time of receiving a label, and in dotted line positions as the label is stripped from the applier and applied to a package.
FIG. 2 is a view of the applier of FIG. 1 looking from the left end in the direction of the arrow 2, but with the parts in the positions they occupy with the label at the delivery station.

In FIG. 1, a label applier 10 is shown receiving an inverted label 12 from a printer and memory controller 14. The system depicted preferably utilizes self-adhesive thermal labels, the most common labels in use today for meat and produce packages in supermarkets. Such labels are typically carried on a release-type backing strip which intermittently carries labels on demand to a thermal print head of the printer 14, where they are printed and then forwarded to a pick-up station 16. This type of printer is well known in the art. It will not be further described except to say that labels arriving at the station 16 are inverted and the backing strip is stopped with only a thin strip of the trailing edge of the label being retained on the backing strip to hold the label steady for receipt by a vacuum wand or tube 18. The wand 18 pivots downwardly along arrow 20 to the dotted line position of the vacuum cup or sucker 22 at the end of the wand 18, where it arrives at a delivery station 24. As the label reaches the delivery station 24, it is positioned below a stripper plate 26 of a label stripping assembly 28. The assembly includes pairs of pivotally-connected scissor-action arms 30 and 32 which are activated by an air cylinder 34 to cause the stripper plate 26 to remove the label 12 from the sucker 22 and slap it onto a package 36. Timed vacuum means (not shown) applies vacuum to the sucker 22 at the time of pick-up of a label, maintains it "on" throughout its travel to the delivery station and releases vacuum just as the cylinder 34 performs the stripping function. In addition, the wand 18 is caused to pivot between the stations 16 and 24 in response to appropriately timed application of vacuum to one or the other of a pair of air cylinders 38 and 40 to be described in connection with FIG. 3.

Shown only generally in FIGS. 1 and 10 are conveyor belts 42 which carry the package 36 into position to receive a label 12. While the conveyor may be a stand-alone unit for carrying previously-wrapped packages (or any article to be labeled, for that matter), the improved system finds its greatest advantage when used in conjunction with an automatic wrapping machine such as is described in U.S. Pat. No. 4,813,211 issued to Treiber on Mar. 21, 1989. Such machine has the capability of wrapping up to 32 packages per minute. Connected to such wrapping machine at its exit end is a conveyor 44 (see FIG. 10.) The conveyor 44 incorporates therein a high speed weighing unit 46, of any suitable type. Weighing can be performed on-the-fly or with the conveyor coming to a stop for a weighing operation, depending upon the design and performance characteristics of the unit.

Let us assume that an operator must wrap, weigh and label with a label such as the one shown in FIG. 9, eighty packages of several different meat products. For ease of operation, each particular product would preferably be wrapped as a group, although that is not essential. Before the first product is introduced into the wrapping machine the operator refers to a PLU book 48, receives the product's code number, and punches that code number into a keyboard 50 adjacent the infeed of the wrapping machine. The price for that product will have already been put into the memory of an electronic conveyor and label applier controller 52. Also in memory, or capable of being independently input by using an override button on the keyboard 50, is the particular angular orientation of the label to be applied to the packages of that particular product. It may also be that some of the packages of that one product may have one label orientation and other packages, because they are of a different size or shape, require a different orientation. At the exit end of the wrapper, the wrapped packages are transferred to the conveyor 44, weighed, and from there are transferred to the conveyor belts 42. The belts 42 position the package to be labeled with one side edge and either the leading or trailing edge of the package in a predetermined position to receive its label. Various types of sensing and aligning mechanisms are possible, depending on the package placing technique most suitable for applying the labels. The controller 52 gets its weight information from the weighing unit, calculates the total value of the package according to its weight and price per unit of weight, prints the label and places the label in the pick-up station 16 for application to the package 36 when it arrives in position to receive its label. The mechanisms for performing the wrapping, weighing, computing and controlling functions are well understood in the art and will not be further described in detail. See, as examples of representative equipment, the aforementioned Treiber U.S. Pat. No. 4,813,211 and U.S. Pat. No. 4,423,486 issued to Berner on Dec. 27, 1983.

Once the operator has input the appropriate code into the controller 52 from the keyboard 50 and has fed the packages to the wrapping machine, he can proceed with packages of different products by following the same procedure. Or, as stated earlier, if different size or shape packages of the same product require different angular orientations of labels, that too can be accommodated. Everything is automatically performed thereafter, and a completely wrapped, weighed and labeled package is delivered off belts 42 to be placed on trays of products for transportation to a meat case where they are available for customer selection.

Referring back to FIGS. 1-3, the preferred form of label applier 10 comprises a drive bevel gear 54 freely mounted on a hollow pivotal shaft 56. Gear 54 meshes with a driven bevel gear 58 which is fixed to pivot with shaft 56. Gear 58 is carried on the wand 18 and rotates the wand on its axis to turn the label whenever required to do so. The wand 18 is journalled on its axis in a head member 59 carried on and fixed to the end of the shaft 56. The arrangement of the shaft and gears is such that, if the gear 54 pivots for the full stroke of the shaft, which in the disclosed design is 180 degrees, driven gear 58 remains non-rotational and the label is merely inverted. The label will then be applied to the top of the package in the relation shown in FIG. 4A. Conventional air passages are provided through the hollow shaft 56 and center of wand 18 to communicate vacuum to the sucker 22.

Figure 4A:
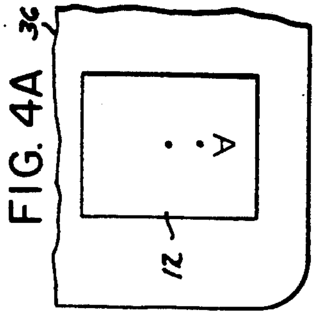
FIGS. 4A-4C are similar views of the top corner of a package with the labels placed in non-rotation position in FIG. 4A, 270 degree rotation in FIG. 4B, 180 degree rotation in FIG. 4C and 90 degree rotation in FIG. 4D.
Figure 4B:
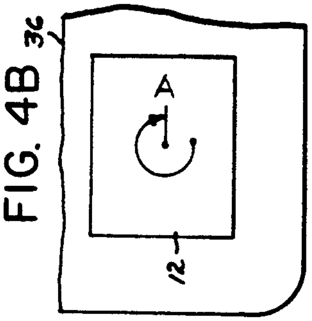
Figure 4C:
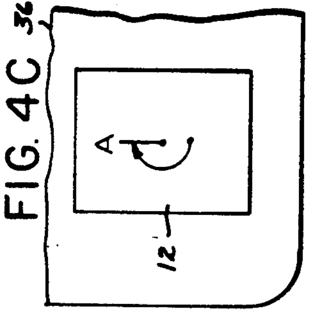
Figure 4D:
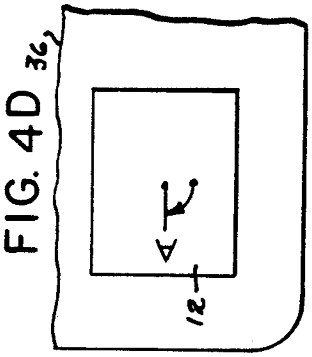

If the label is to be placed in any of three other angular positions as shown in FIGS. 4B-4D, however, the drive gear 54 must be arrested and stopped from further movement part way through the stroke of the shaft 56. When so arrested, the driven gear 58, since designed to pivot with shaft 56, commences to rotate the wand and turn the label. The amount of label turning is controlled by the position in which drive gear 54 stops in its movement toward the delivery station 24. The gear 54 stops in response to that one of three electric solenoids 60 which is activated to cause one of intercepting pins 62, 64 or 66 to engage an abutment 68 on the back side or back face of gear 54. These pins may be armatures of the solenoids 60 and are moved into intercepting positions in response to an electrical signal from the controller 52. The selected solenoid is activated when the wand 18 is in the upright position at the pick-up station 16, but in any event, before the abutment 68 pivots to the location of pin 62. Referring to FIGS. 5-8, the successive steps of travel of the elements of the label applier from the pick-up to the delivery station will cause the label to turn 270 degrees to the position shown in FIG. 4B. To accomplish this, pin 62 stops drive gear 54 and, upon stopping, rotates driven gear 58 and wand 18 through an angle of 270 degrees. The gear ratio between gear 54 and 58 is 2:1.

If it is desired to select angles of label turning of 180 or 90 degrees, the operator controls the system to engage either one of pins 64 or 66 instead of 62. These will position labels in either of the orientations shown in FIGS. 4C or 4D, respectively.

The details of the mechanism for accomplishing the arresting and return of the parts to their original positions is illustrated in FIGS. 5-8. In FIG. 5, which is a top view of a portion of the label applier 10, the shift 56, which is tubular for enabling vacuum to flow therethrough, carries a sleeve 70 fixed to the shaft by means of a screw 72. The sleeve 70 journals the gear 54 for free rotation relative to the sleeve and shaft. A spring 74 surrounds the sleeve 70, and is anchored at one end to the screw 72 and at the other end to a protrusion 76 formed on the rear of the gear 54. The gears 54 and 58 are preferably molded of glass reinforced nylon. As can be seen from FIGS. 6-8, the spring 74 biases the gear 54 in a clockwise direction, but is prevented from moving the full stroke of the shaft 56 whenever intercepted by one of the pins 62, 64 or 66. Sleeve 70 is provided with a flange or shoulder 78 at the left end of which is an abutment 80. Abutment 80 restrains gear 54 from clockwise movement beyond the delivery station when no wand rotation is to occur, and assures return of gear 54 to the pick-up position if one of the solenoids was activated to stop gear 54 rotation during wand travel. Abutment 80 is forced by spring 74 against the protrusion 76 at all times except when a pin has intercepted the gear for turning a label held by the wand. The abutment 80 continues travel with sleeve 70, while protrusion 76 stops along with gear 54.

Figure 3:
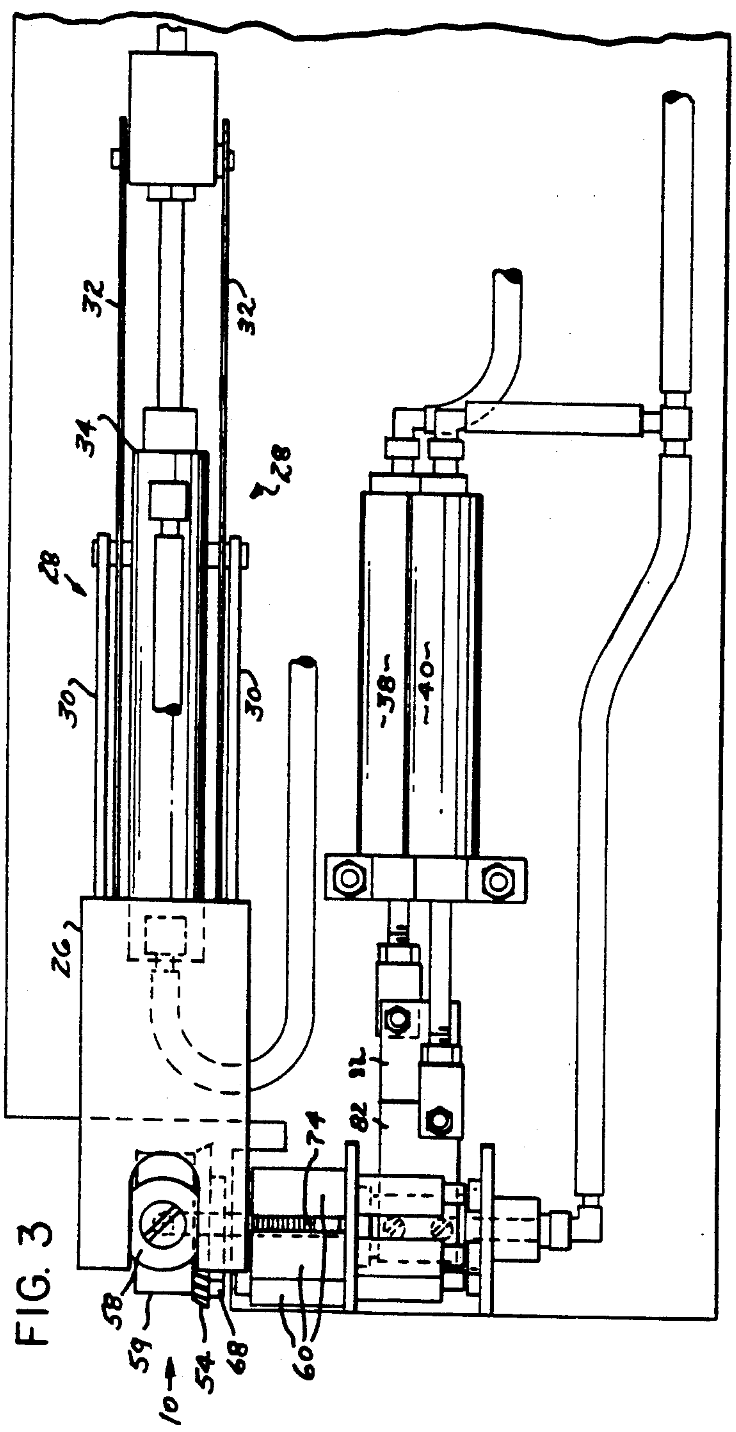
FIG. 3 is a view from underneath as seen looking in the direction of arrow 3 of FIG. 1.

As referred to only generally previously, shaft 56 is pivoted through an angle of 180 degrees. This is accomplished through a reversing belt drive 82 shown in FIG. 1. The belt drive is pulled in opposite directions through application of timed vacuum as required to move the wand in the directions of arrow 20. Opposite ends of the belt drive 82 are connected to cylinders 38 and 40 (FIG. 3). Conventional threaded adjustments are provided at the connection of the belt ends to the shafts of the pistons of cylinders 38 and 40 to properly place the label applier in the correct starting and stopping locations for receipt and delivery of labels.

While I have shown the gears as bevel gears on intersecting axes, other types of right angle gears and non-intersecting axes are also feasible. In addition, the label applier may be used to side label packages or other articles, in which case the label would be applied to the side of an article while in a vertical plane, rather than horizontal as shown. Further, while I prefer to utilize a stripping means to take the label at the delivery station and slap it onto a package, it is feasible in some applications to utilize the wand to apply the label directly to a package. And while I have shown electrically-operated solenoids for intercepting gear 54, the same function can be obtained pneumatically by electrically controlling a valve for actuating pneumatic intercepting means. These and various other changes may be made without departing from the spirit and scope of the claims.

Having described my invention, I claim:

1. In a label applying system for automatically labeling articles in any one of multiple angular label orientations in response to selective operator control of label orientation from a position remote from a label applier:
 - a label printer for delivering a printed label to a label pick-up station;
 - a label applier at said label pick-up station for receiving printed labels and transfering them to a label delivery station, said applier comprising a label transfering vacuum tube rotatable about its axis;
 - an operator keyboard for manually inputting information regarding a selected angular orientation of a given label;
 - a control unit for receiving information from said keyboard and controlling rotation of said label applier to perform the label orientation selected by said operator; and
 - electrically-operated means responsive to said control unit for rotating labels from a first position to a second position in accordance with the selection by said operator, said rotation occurring during transfer of said label from said pick-up to said delivery station.

2. The invention according to claim 1 wherein said label applying system receives articles from a weighing system conveyor at which articles are individually weighed, and wherein each label is individually printed at said printer with the article weight, its value per unit of weight and its total monetary value.

3. The invention according to claim 2 wherein said weighing system conveyor is connected to and receives articles from an automatic wrapping machine, and wherein said articles are packages of wrapped meat.

4. The invention according to claim 1 wherein said electrically-operated means are a plurality of selectively operable electric solenoids.

5. The invention according to claim 4 wherein said solenoids are effective to arrest movement of a portion of the label applier and to thereby effect rotation of the tube on its axis in response to said arresting, and wherein said applier includes a lost motion mechanism enabling the vacuum tube to traverse its full stroke between the pick-up and delivery stations despite said portion being arrested.

6. In a label applier for grasping a printed side of a self-adhesive label and transporting the label from a pick-up station to a delivery station for application in either of at least two different angular orientations to a package surface with the printed side of said label facing outwardly from said package, said applier comprising:

a hollow reversible shaft mounted for rotation on an axis generally parallel to the package surface;

means for driving said shaft in opposite directions during each label applying operation;

a pair of right angle-axes gears including a drive gear freely journaled relative to said shaft and a driven gear in mesh with said drive gear;

a hollow tubular wand fixed in perpendicular relation to said shaft axis and extending on opposite sides thereof, said hollow wand coaxially supporting and being fixed to said driven gear and further being open to atmosphere at one end to comprise a vacuum gripper;

normally-engaged clutch means intermediate said shaft and said drive gear for rotating said shaft and drive gear together through the same angles while in clutching engagement;

means for communicating vacuum through said shaft to said tube and gripper at a predetermined time in a label applying operation when said gripper is adjacent said pick-up station to pick up the label;

said shaft driving means driving said shaft to transport the label to said delivery station and said vacuum means maintaining vacuum at said label during label transport and thereafter discontinuing application of vacuum to said wand to enable label application to a package upon arrival at said delivery station;

means for selectively declutching said driving gear from said shaft at a predetermined angular position of said wand during its movement toward said delivery station and for restraining said driving gear against further rotation with said shaft, whereby, when said driving gear is so restrained, the driven gear is driven to rotate the wand about the axis of said driven gear and thereby rotate said label to a different angular relation to said package than would have occurred had the driving gear remained unrestrained; and means for restoring said driving gear to its original angular orientation with said shaft upon return of said wand to said pick-up station for a next-following label.

7. The invention according to claim 6 wherein said gears are intersecting-axes bevel gears.

8. The invention according to claim 6 wherein said shaft axis is horizontal and wherein said label is upside down at said pick-up station and right side up at said delivery station.

9. The invention according to claim 6 wherein said clutch means comprises an abutment on a back side of said driving gear, an opposing abutment fixed relative to said shaft and spring means biasing said abutments into engagement toward said pick-up station.

10. The invention according to claim 9 wherein said restraining means comprises a second abutment on the back side of said drive gear and an intercepting abutment which is selectively moved from a non-intercepting to an intercepting position to cause said opposing clutch abutments to separate and said driving gear to stop, thereby enabling rotation of said wand in response to rotation of said driven gear.

11. The invention according to claim 6 wherein said drive shaft is driven through an angle of 180 degrees and wherein the label is inverted without angular orientation of said wand in the event the driving gear and shaft remain in clutching engagement throughout the 180 degree movement.

12. The invention according to claim 11 wherein at least two restraining means are provided and are spaced in the path of travel of said driving gear to intercept and restrain said driving gear at positions which rotate said driven gear at least two of 90, 180 and 270 degrees relative to the position of said driven gear when the clutching means is engaged.

13. The invention according to claim 12 wherein said a restraining means is provided for each of the mentioned degrees, thereby enabling said label to be oriented in any of four different positions which are 90 degrees apart.

14. The invention according to claim 6 wherein said gripper is mounted on the end of said wand remote from said driven gear and on the opposite side of said shaft.

15. The invention according to claim 6 wherein said restraining means comprises an abutment on the back side of said driving gear and an armature of an electrically-operated solenoid, said solenoid, when energized, intercepting and restraining said abutment and therewith said driven gear.

16. The invention according to claim 15 wherein three such solenoids are provided adjacent said driving gear and wherein said solenoids are positioned to selectively cause rotation of said wand through angles of 90, 180 and 270 degrees, depending on which solenoid is actuated.

17. The invention according to claim 16 wherein the solenoid selected is determined by an operator of the label applier and is timed to operate when a package is in position to be labeled.

* * * * *